United States Patent Office 2,914,534
Patented Nov. 24, 1959

2,914,534

CERTAIN SUBSTITUTED 6-AMINO-3,5-DICYANO-2-PICOLINES AND PROCESS

William Joseph Middleton, Claymont, Del., assignor to E. I. du Pont de Nemours and Company, Wilmington, Del., a corporation of Delaware No Drawing. Application July 25, 1955
Serial No. 524,307

13 Claims. (Cl. 260—294.9)

This invention is concerned with organic acids and their salts and more particularly with a new class of substituted 6-amino-3,5-dicyano-2-picolines, and with a process for their preparation.

The scope of the term acid has broadened substantially, under the influence of the concepts introduced by G. N. Lewis, to include compounds which are not acids in the classical sense of having hydrogens readily ionizable in water. The organic compounds which are acids in the classical sense are comprised primarily of the carboxylic acids, and it has only recently been discovered that suitable activating groups will cause hydrogen directly attached to carbon to become ionizable as an acid in water.

It is an object of this invention to provide new organic compounds having a hydrogen-bearing carbon atom which is sufficiently activated to be strongly acidic and form salts readily. Another object is to provide a process for preparing such compounds. Other objects will become apparent from the specification and claims.

In accordance with this invention, there is provided a new class of α,α-disubstituted 6-amino-3,5-dicyano-2-picoline compounds having two electron-withdrawing groups as substituents in the alpha position. The alpha carbon of these compounds is so activated that ionization readily occurs at the remaining alpha position to yield a proton in water. These compounds are strongly acidic. A process for preparing such compounds is provided in which a 6-amino-3,5-dicyano-2-halogenopyridine is reacted with an alkali metal derivative of an active methylene compound, as suitably reactive methylene compounds are provided when electron-withdrawing groups are substituents.

The electron-withdrawing groups referred to are recognized in the art as groups stable in alcoholic alkali metal alkoxide solution which are strongly meta directing in aromatic substitution. Specifically, these groups are characterized by being stable to alcoholic alkali metal alkoxide solution and possessing a polarizing force greater than $0.8 \times 10^{-4}$ dynes. The polarizing force of electron-withdrawing substituents is discussed in detail by C. C. Price, Chem. Reviews 29, 54–59 (1941).

The presence of two of these electron-withdrawing groups in the alpha position of the 6-amino-3,5-dicyano-2-picolines of this invention has been found to activate the remaining hydrogen of the alpha group to such an extent that it becomes ionizable as an acid in water. In the process of this invention, these substituted picolines are prepared initially as alkali metal salts, from which the free acid form is readily obtained by replacing the metal ion with a hydrogen ion by conventional methods. Other salts are readily obtained by methathesis with compounds containing a salt-forming cation, such as a metal, amine or sulfonium salt or a basic dye. For convenience in naming the salts which are included in the new class of substituted picolines, the anion which is formed by removal of a single proton from the alpha position of one of the specified class of 6-amino-3,5-dicyano-2-picoline compounds is designated as the corresponding α,α-disubstituted 6-amino-3,5-dicyano-2-picolinide ion.

In the process of this invention for preparing such products a 6-amino-3,5-dicyano-2-halogenopyridine is reacted with an alkali metal derivative of a methylene compound having two electron-withdrawing groups as substituents on the methylenic carbon, the two groups being those desired in the final product, e.g., cyano, acetyl, benzoyl, carbamoyl, ethoxycarbonyl, ethoxysulfonyl, methylsulfonyl, phenylsulfonyl, 1-amino-2,2-dicyanovinyl, nitro and N-pyridinium substituents, as will be illustrated in the examples. The presence of these electron-withdrawing groups gives an active methylene compound in which one of the remaining hydrogens of the methane nucleus can readily be substituted by an alkali metal to give a compound of suitable reactivity for use in the process.

The process of the present invention may be represented by the following equation:

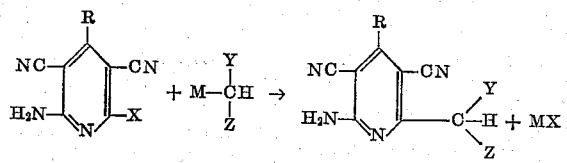

where M is an alkali metal (lithium, sodium, potassium, rubidium, or cesium), X is halogen (fluorine, chlorine, bromine, or iodine), Y and Z are substituents stable to alcoholic alkali metal alkoxide and having a polarizing force greater than $0.8 \times 10^{-4}$ dynes, and R is hydrogen or a nucleophilic or electrophilic substituent. Substituents preferred for R, in addition to hydrogen, include cyano, dicyanomethyl, amino halogen, hydroxyl, alkyl, aryl, alkoxy, aryloxy, alkylthio, arylthio, alkylsulfinyl, arylsulfinyl, alkylsulfonyl, and arylsulfonyl. The groups most preferred for R are hydrogen and cyano.

The process must be carried out in the absence of water because water would consume the alkali metal derivative of the active methylene compound in a side reaction. While it is possible to carry out the reaction by simply bringing the above-noted reactants into suitable contact, for example, by grinding together dry reactants, such a procedure involves risk of the reaction taking place with explosive violence and it is preferred to conduct the reaction in an anhydrous liquid medium which is inert to the reactants. Suitable liquid media comprise the alcohols such as methanol, ethanol, butanol, ethylene glycol and the like, ethers such as dimethyl ether, diethyl ether, tetrahydrofuran and the like, and hydrocarbons such as hexane, benzene, toluene, the xylenes and the like. The preferred media are those which are solvents for both the reactants, particularly the alcohols, so that the reactants may be brought together in solution.

The reaction of the present invention is preferably carried out at room temperature although mildly elevated temperatures, i.e., up to 100° C., may be employed if desired. Pressure is not a critical factor in the reaction.

The proportions of the reactants employed in this invention are not critical for operability. However, the highest yields of α,α-disubstituted 6-amino-3,5-dicyano-2-picolines are obtained when approximately equal molecular equivalents of a 6-amino-3,5-dicyano-2-halogenopyridine and an alkali metal derivative of an active methylene compound are reacted in the presence of sufficient, e.g., an additional molecular equivalent, of an alkali metal base to form the corresponding alkali metal salt of the α,α-disubstituted 6-amino-3,5-dicyano-2-picoline. This additional equivalent of an alkali metal base may be in the form of a second equivalent of the alkali metal derivative of the active methylene compound. Alternatively it may be an alkali metal alkoxide or any alkali metal basic substance such as the carbonate or hydroxide of lithium, sodium, potassium, rubidium, or cesium.

In a preferred procedure for carrying out the process of this invention, a sodium derivative of an active methylene compound (e.g., sodiomalononitrile) is prepared in situ in alcoholic solution (e.g., ethanol) by reacting the parent active methylene compound (e.g., malononitrile) with an excess of sodium alkoxide (e.g., sodium ethoxide). In this solution there is then dissolved a 6-amino-3,5-dicyano-2-halogenopyridine (e.g., 6-amino-2-chloro-3,4,5-tricyanopyridine). The solution is agitated at room temperature, and the sodium $\alpha,\alpha$-disubstituted 6-amino-3,5-dicyano-2-picolinide which is formed (e.g., sodium 6-amino-$\alpha,\alpha$,3,4,5-pentacyano-2-picolinide) separates as a precipitate and may be separated from the reaction mixture by filtration. This sodium salt is readily converted to the free acid by passing a solution of the salt through a bed of cation-exchange resin in acid form. Other salts are prepared from the free acid by metathesis.

The 6-amino-3,5-dicyano-2-halogenopyridines, which are starting materials for this invention, are prepared by the reaction of the corresponding 1,1,3,3-tetracyanopropenes with hydrogen halides as shown in more detail in the discussion following the examples.

In the following examples, which illustrate preferred embodiments of the invention, parts are by weight:

EXAMPLE I

*Tetraethylammonium 6-amino-α,α,3,4,5-pentacyano-2-picolinide*

An ethanol solution of sodiomalononitrile is prepared by dissolving 115 parts of sodium in 7893 parts of absolute ethanol, and adding 330 parts of malononitrile. To this solution is added 620 parts of 6-amino-2-bromo-3,4,5-tricyanopyridine, and the mixture is stirred until all the solid dissolves. After standing at room temperature for one hour, a yellow-orange precipitate of sodium 6-amino-α,α, 3,4,5-pentacyano-2-picolinide forms which is collected on a filter, washed with a small amount of alcohol, and dissolved in 5000 parts of water. To this aqueous solution is added a solution of 1090 parts of tetraethylammonium bromide in 5000 parts of water. The orange precipitate which forms is collected on a filter, washed with water, and recrystallized from water. There is obtained 650 parts of tetraethylammonium 6-amino-α,α,3,4,5-pentacyano-2-picolinide in the form of orange, matted needles, M.P. 190–191° C.

*Analysis.*—Calcd. for $C_{19}H_{22}N_8$: C, 62.96; H, 6.12; N, 30.96. Found: C, 63.04, 62.91; H, 6.06, 6.15; N, 30.90, 30.92.

The light absorption spectrum of an acetone solution of this product shows two peaks, one at 347 millimicrons (molecular extinction coefficient 32,200) and the other at 459 millimicrons (molecular extinction coefficient 8,000).

When N-methylquinolinium iodide is substituted for tetraethylammonium bromide in Example I, orange crystals of N-methylquinolinium 6-amino-α,α,3,4,5-pentacyano-2-picolinide are obtained.

EXAMPLE II

*6-amino-α,α,3,4,5-pentacyano-2-picoline*

Tetraethylammonium 6-amino-α,α,3,4,5-pentacyano-2-picolinide (30 parts) is dissolved in 396 parts of acetone and this solution is passed slowly through a bed of sulfonic acid ion exchange resin in acid form. An afterwash of acetone is also passed through the bed. The combined acetone effluent is evaporated and 20 parts of 6-amino-α,α,3,4,5-pentacyano-2-picoline is obtained in the form of an orange solid which does not melt below 300° C. This free acid has a pKa (logarithm of the reciprocal of the dissociation constant) in water of 2.3.

*Analysis.*—Calcd. for $C_{11}H_3N_7$: C, 56.70; H, 1.28; N, 42.00; neutral equivalent, 233. Found: C, 56.95, 57.17; H, 2.57, 2.42; N, 41.80, 41.74; neutral equivalent, 240, 247.

EXAMPLE III

*Tetramethylammonium 6-amino-α,α,3,4,5-pentacyano-2-picolinide*

An ethanolic solution of sodiomalononitrile is prepared by first dissolving 115 parts of sodium in 7893 parts of absolute ethanol, and then adding 330 parts of malononitrile. To this solution is added 620 parts of 6-amino-2-bromo-3,4,5-tricyanopyridine, and the mixture is stirred until all the solid dissolves. After standing at room temperature for 30 minutes, an orange precipitate of sodium 6-amino-α,α,3,4,5-pentacyano-2-picolinide forms which is collected on a filter, washed with ether, and dissolved in 10,000 parts of water. To this aqueous solution is added a solution of 1000 parts of tetramethylammonium chloride in 10,000 parts of water. The orange precipitate which forms is collected on a filter, washed with water, and recrystallized from water. There is obtained 400 parts of tetramethylammonium 6-amino-α,α,3,4,5-pentacyano-2-picolinide in the form of orange needles, M.P. >300° C.

*Analysis.*—Calcd. for $C_{15}H_{14}N_8$: C, 58.81; H, 4.61; N, 36.59. Found: C, 59.29; H, 4.80; N, 36.33, 36.61.

EXAMPLE IV

*Trimethylsulfonium 6 - amino - α,α,3,4,5 - pentacyano-2-picolinide*

An ethanolic solution of sodiomalononitrile is prepared by first dissolving 115 parts of sodium in 7893 parts of absolute ethanol, and then adding 330 parts of malononitrile. To this solution is added 510 parts of 6-amino-2-chloro-3,4,5-tricyanopyridine, and the mixture is stirred until all of the solid dissolves. After standing at room temperature for one hour, an orange precipitate of sodium 6-amino-α,α,3,4,5-pentacyano-2-picolinide forms which is washed with a little alcohol and dissolved in 5000 parts of water. To this aqueous solution is added a solution of 1020 parts of trimethylsulfonium iodide in 5000 parts of water. The orange precipitate which forms is collected on a filter, washed with water, and recrystallized from water. There is obtained 650 parts (83% yield) of trimethylsulfonium 6-amino-α,α,3,4,5-pentacyano-2-picolinide in the form of orange, matted needles which decompose without melting above 260° C.

*Analysis.*—Calcd. for $C_{14}H_{11}N_7S$: C, 54.35; H, 3.58; N, 31.70; S, 10.37. Found: C, 54.46; H, 3.55; N, 31.77, 31.85; S, 10.48, 10.36.

EXAMPLE V

*α - (N-pyridinium) - α - acetyl-6-amino - 3,4,5-tricyano-2-picolinide*

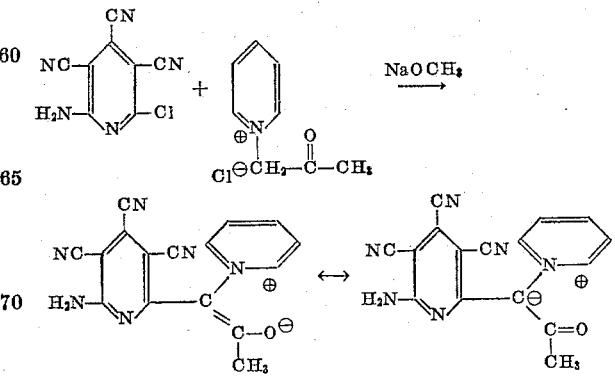

Separate solutions of 688 parts of N-(acetonyl)-pyridinium chloride in 3964 parts of methanol, 216 parts of sodium methoxide in 3964 parts of methanol, and 407 parts of 6-amino-2-chloro-3,4,5-tricyanopyridine in 1980 parts of acetone are mixed simultaneously and rapidly. An orange color develops. About 50,000 parts of water is added after one hour, and the orange-brown precipitate which forms is collected on a filter, washed with water, and recrystallized from water. There is obtained 210 parts of the inner-salt, α-(N-pyridinium)-α-acetyl-6-amino-3,4,5-tricyano-2-picolinide, in the form of an orange-brown powder, M.P. 192–194° C., d.

*Analysis.*—Calcd. for $C_{16}H_{10}N_6O$: C, 63.57; H, 3.33; N, 27.80. Found: C, 63.30, 63.14; H, 3.43, 3.60; N, 27.66, 27.83.

The light absorption spectrum of an acetone solution of this inner-salt showed two peaks, one at 353 millimicrons (molecular extinction coefficient 30,600) and a second peak at 459 millimicrons (molecular extinction coefficient 9,700).

EXAMPLE VI

*Part A.—Preparation of 2-amino-1,1,3-tricyano-1-propene*

Sodiomalononitrile, 11.0 parts, is suspended in 132 parts of dry benzene and the mixture is refluxed for 24 hours with constant agitation. The mixture is then filtered, and the solid is dried at room temperature. The resulting solid is dissolved in 150 parts of ice cold water, and the solution is slowly treated with 8.3 parts of concentrated hydrochloric acid (d.=1.19) whereupon a tan crystalline solid separates. The solid reaction product is isolated by filtration under reduced pressure, washed with water, and dried at room temperature. Recrystallization from hot water yields 5.4 parts, corresponding to a yield of 65%, of well-defined needles of 2-amino-1,1,3-tricyano-1-propene, M.P. 170–173° C.

*Part B.—Sodium 6-amino-α-(1-amino-2,2-dicyanovinyl)-α,3,4,5-tetracyano-2-picolinide*

A solution of 1026 parts of sodium methoxide in 7928 parts of methyl alcohol is added to a solution of 2500 parts of 2-amino-1,1,3-tricyano-1-propene in 31,712 parts of methyl alcohol. To this solution is added 1950 parts of 6-amino-2-chloro-3,4,5-tricyanopyridine, and the mixture is stirred until all solid dissolves. A dark brownish-purple precipitate forms upon standing. About 71,350 parts of ether is added, and the precipitated solid is collected on a filter, washed with ether, and then dried. The brownish-purple powder is stirred in about 10,000 parts of water, and the undissolved material is collected on a filter and dried. There is obtained 2100 parts of crude sodium 6-amino-α-(1-amino-2,2-dicyanovinyl)-α,3,4,5-tetracyano-2-picolinide in the form of a browish-purple salt, M.P. <300° C. This salt is slightly soluble in hot water and in acetone.

The light absorption spectrum of an acetone solution of this crude material shows two peaks, one at 349 millimicrons (molecular extinction coefficient 29,200) and the second at 531 millimicrons (molecular extinction coefficient 14,500).

EXAMPLE VII

*Sodium 6-amino-α,α-bis(ethoxycarbonyl)-3,4,5-tricyano-2-picolinide*

In the manner of Example VI a methanol solution of the sodium derivative of diethyl malonate is prepared from methanol, diethyl malonate and an excess of sodium methoxide. To this solution there is added 6-amino-2-chloro-3,4,5-tricyanopyridine. The sodium 6-amino-α,α-bis(ethoxycarbonyl)-3,4,5-tricyano-2-picolinide which is formed colors the solution bright orange-yellow.

EXAMPLE VIII

*Sodium 6-amino-α-ethoxycarbonyl-α,3,4,5-tetracyano-2-picolinide*

In the manner of Example VI a methanol solution of the sodium derivative of ethyl cyanoacetate is prepared from methanol, ethyl cyanoacetate and an excess of sodium methoxide. To this solution there is added 6-amino-2-chloro-3,4,5-tricyanopyridine. The sodium 6-amino-α-ethoxycarbonyl-α,3,4,5-tetracyano-2-picolinide which is formed colors the solution bright orange.

EXAMPLE IX

*Sodium 6-amino-α,α-bis(carbamoyl)-3,4,5-tricyano-2-picolinide*

In the manner of Example VI a methanol solution of the sodium derivative of malonamide is prepared from methanol, malonamide and an excess of sodium methoxide. To this solution there is added 6-amino-2-chloro-3,4,5-tricyanopyridine. The sodium 6-amino-α,α-bis(carbamoyl)-3,4,5-tricyano-2-picolinide which is formed colors the solution bright orange.

EXAMPLE X

*Sodium 6-amino-α,α-bis(methylsulfonyl)-3,4,5-tricyano-2-picolinide*

In the manner of Example VI a methanol solution of the sodium derivative of bis(methylsulfonyl)methane is prepared from methanol, bis(methylsulfonyl)methane and an excess of sodium methoxide. To this solution there is added 6-amino-2-chloro-3,4,5-tricyanopyridine. The sodium 6-amino-α,α-bis(methylsulfonyl)-3,4,5-tricyano-2-picolinide which is formed colors the solution bright yellow.

EXAMPLE XI

*Sodium 6-amino-α-phenylsulfonyl-α,3,4,5-tetracyano-2-picolinide*

In the manner of Example VI a methanol solution of the sodium derivative of phenylsulfonylacetonitrile is prepared from methanol, phenylsulfonylacetonitrile and an excess of sodium methoxide. To this solution there is added 6-amino-2-chloro-3,4,5-tricyanopyridine. The sodium 6-amino-α-phenylsulfonyl-α,3,4,5-tetracyano-2-picolinide which is formed colors the solution bright orange-yellow.

EXAMPLE XII

*Sodium 6-amino-α,α-bis(acetyl)-3,4,5-tricyano-2-picolinide*

In the manner of Example VI a methanol solution of the sodium derivative of acetylacetone is prepared from methanol, acetylacetone and an excess of sodium methoxide. To this solution there is added 6-amino-2-chloro-3,4,5-tricyanopyridine. The sodium 6-amino-α,α-bis(acetyl)-3,4,5-tricyano-2-picolinide which is formed colors the solution bright orange-yellow.

EXAMPLE XIII

*Sodium 6-amino-4-(p-dimethylaminophenyl)-α,α,3,5-tetracyano-2-picolinide*

A suspension of sodiomalononitrile in ethanol (nitrogen atmosphere) is prepared by the addition of 65 parts of malononitrile in 79 parts of ethanol to a solution of sodium ethoxide (from 22.6 parts of sodium) in 316 parts of ethanol. An additional 237 parts of ethanol is added, the suspension is cooled to 0° C. and a suspension of 146 parts of 6-amino-2-chloro-3,5-dicyano-4-(p-dimethylaminophenyl)pyridine in 2550 parts of dimethylformamide is added with stirring over a period of fifteen minutes. The reaction mixture is stirred an additional forty-five minutes at 0° C. and then two and one-quarter hours at room temperature during which time the solid all dissolves. The solvent is removed at reduced pressure and the semi-solid residue is washed with benzene to leave the crude sodium 6-amino-4-(p-dimethylaminophenyl)-α,α,3,5,-tetracyano-2-picolinide in the form of a tan solid.

EXAMPLE XIV

*Tetramethylammonium 6-amino-4-(p-dimethylaminophenyl)-α,α,3,5-tetracyano-2-picolinide*

The crude sodium 6-amino-4-(p-dimethylaminophenyl)-α,α,3,5-tetracyano-2-picolinide formed in Example XIII is dissolved in 10,000 parts of hot water. An aqueous solution of 70 parts of tetramethylammonium chloride is added and the mixture is cooled to room temperature with stirring. There is obtained as a crystalline precipitate 160 parts of crude tetramethylammonium 6-amino-4-(p-dimethylaminophenyl)-α,α,3,5-tetracyano-2-picolinide in the form of a mustard yellow solid which turns brown at 290° C. and melts above 300° C. The salt is recrystallized from methanol. The light absorption spectrum of an acetonitrile solution of this recrystallized material shows two absorption peaks, one at 254 millimicrons (molecular extinction coefficient 31,000) and the other at 344 millimicrons (molecular extinction coefficient 44,500).

*Analysis.*—Calcd. for $C_{22}H_{24}N_8$: C, 65.98; H, 6.04; N, 27.98. Found: C, 66.18; H, 6.04; N, 28.07.

Tetramethylammonium 6-amino-4-(p-dimethylaminophenyl)-α,α,3,5-tetracyano-2-picolinide dyes wool a mustard color.

EXAMPLE XV

*Cupric 6-amino-α,α,3,4,5-pentacyano-2-picolinide*

Sodium 6-amino-α,α,3,4,5-pentacyano-2-picolinide (51 parts) is dissolved in 500 parts of water and a hot solution of 25 parts of cupric sulfate in 250 parts of water is added. The solution is allowed to stand for 16 hours, during which time a black crystalline precipitate forms. This is collected on a filter and dried to obtain 40 parts of cupric 6-amino-α,α,3,4,5-pentacyano-2-picolinide in the form of a black solid.

*Analysis.*—Calcd. for $CuC_{22}H_4N_{14}\cdot\tfrac{1}{2}H_2O$: Cu, 11.85; C, 49.3; H, 0.93; N, 36.5. Found: Cu, 12.51, 12.37; C, 49.39, 49.66; H, 1.05, 1.06; N, 36.90, 36.72.

Cupric 6-amino-α,α,3,4,5-pentacyano-2-picolinide may be dispersed as a pigment in any conventional coating composition vehicle in the preparation of an enamel, printing ink or the like. Suitable vehicles include linseed oil, alkyd resin solutions and solutions of nitrocellulose. For example, when the pigment is dispersed in an alkyd resin solution, a black enamel is formed.

EXAMPLE XVI

A 20% aqueous solution of sodium 6-amino-α,α,3,4,5-pentacyano-2-picolinide is prepared. One-volume portions of this solution are added respectively to ten-volume portions of 10% aqueous solutions of cobaltous acetate, nickelous sulfate and ferrous sulfate. There are obtained respectively as precipitates orange-brown crystals of cobaltous 6-amino-α,α,3,4,5-pentacyano-2-picolinide, brown crystals of nickelous 6-amino-α,α,3,4,5-pentacyano-2-picolinide and orange crystals of ferrous 6-amino-α,α,3,4,5-pentacyano-2-picolinide.

EXAMPLE XVII

A hot solution of 202 parts of tetraethylammonium 6-amino-α,α,3,4,5-pentacyano-2-picolinide in 4760 parts of methanol is mixed with a hot solution of 249 parts of crystal violet in 2775 parts of methanol. As the combined solution cools, a green-black crystalline solid precipitates. This is collected by filtration, washed with cold ethanol and then with cold ether and dried to obtain 249 parts (75% yield) of the crystal violet salt of 6-amino-α,α,3,4,5-pentacyano-2-picoline. A sample recrystallized from butanol melts at 208–209° C. The light absorption spectrum of an acetone solution of the recrystallized salt shows two peaks, one at 348 millimicrons (molecular extinction coefficient 33,200) and another at 590 millimicrons (molecular extinction coefficient 115,000).

*Analysis.*—Calcd. for $C_{36}H_{32}N_{10}$: C, 71.5; H, 5.3; N, 23.2. Found: C, 71.7; H, 5.3; N, 23.2.

The crystal violet salt of 6-amino-α,α,3,4,5-pentacyano-2-picoline is useful as a pigment in printing inks and hectograph inks. Pigments of similar utility are obtained when other basic dyes such as methyl violet or rosaniline are substituted for crystal violet in the process of Example XVII.

EXAMPLE XVIII

The sodium derivatives of the active methylene compounds indicated in Table I below are prepared by dissolving the active methylene compound and an excess of

TABLE I

| Pyridine Starting Material | Active Methylene Compound | α,α-Disubstituted 6-Amino-3,5-dicyano-2-picoline Product |
|---|---|---|
| 6-amino-2-iodo-3,4,5-tricyano-pyridine | benzoyl acetonitrile | sodium 6-amino-α-benzoyl-α,3,4,5-tetracyano-2-picolinide. |
| 6-amino-2-chloro-3,5-dicyano-pyridine | malononitrile | sodium 6-amino-α,α,3,5-tetracyano-2-picolinide. |
| 6-amino-2-chloro-3,5-dicyano-4-methylpyridine | diethyl sulfoacetate | sodium 6-amino-3,5-dicyano-α-ethoxy-carbonyl-α-ethoxysulfonyl-4-methyl-2-picolinide. |
| 6-amino-3,5-dicyano-2-fluoro-4-methylpyridine | ethyl cyanoacetate | sodium 6-amino-α-ethoxycarbonyl-4-methyl-α,3,5-tricyano-2-picolinide. |
| 6-amino-2-chloro-3,5-dicyano-4-methylmercaptopyridine | diethyl malonate | sodium 6-amino-α,α-bis(ethoxycarbonyl)-3,5-dicyano-4-methylmercapto-2-picolinide. |
| 6-amino-2-chloro-3,5-dicyano-4-methylsulfinylpyridine | acetylacetone | sodium 6-amino-α,α-bis(acetyl)-3,5-dicyano-4-methylsulfinyl-2-picolinide. |
| 6-amino-2-chloro-3,5-dicyano-4-methylsulfonylpyridine | bis(methylsulfonyl)methane | sodium 6-amino-3,5-dicyano-α,α,4-tris-(methylsulfonyl)-2-picolinide. |
| 6-amino-2-chloro-3,5-dicyano-4-dicyanomethylpyridine | malononitrile | sodium 6-amino-4-dicyanomethyl-α,α,3,5-tetracyano-2-picolinide. |
| 6-amino-2-chloro-3,5-dicyano-4-hydroxypyridine | do | sodium 6-amino-4-hydroxy-α,α,3,5-tetracyano-2-picolinide. |
| 6-amino-2-bromo-3,5-dicyano-4-phenoxypyridine | ethyl nitroacetate | sodium 6-amino-3,5-dicyano-α-ethoxy-carbonyl-α-nitro-4-phenoxy-2-picolinide. |
| 6-amino-2-chloro-3,5-dicyano-4-phenoxypyridine | benzoyl acetonitrile | sodium 6-amino-α-benzoyl-4-phenoxy-α,3,5-tricyano-2-picolinide. |
| 6-amino-2chloro-3,5-dicyano-4-phenylthiopyridine | malonamide | sodium 6-amino-α,α-bis(carbamoyl)-3,5-dicyano-4-phenylthio-2-picolinide. |
| 6-amino-2-chloro-3,5-dicyano-4-phenylsulfinylpyridine | diethyl malonate | sodium 6-amino-α,α-bis(ethoxycarbonyl)-3,5-dicyano-4-phenylsulfinyl-2-picolinide. |
| 6-amino-2-chloro-3,5-dicyano-4-phenylsulfonylpyridine | phenylsulfonylacetonitrile | sodium 6-amino-α,4-bis(phenylsulfonyl)-α,3,5-tricyano-2-picolinide. |
| 6-amino-2chloro-3,5-dicyano-4-ethoxypyridine | acetylacetone | sodium 6-amino-α,α-bis(acetyl)-3,5-dicyano-4-ethoxy-2-picolinide. |
| 2-chloro-4,6-diamino-3,5-dicyanopyridine | malononitrile | sodium 4,6-diamino-α,α,3,5-tetracyano-2-picolinide. |
| 6-amino-2-chloro-3,5-dicyano-4-methylaminopyridine | malonamide | sodium 6-amino-α,α-bis(carbamoyl)-3,5-dicyano-4-methylamino-2-picolinide. |
| 6-amino-2-chloro-3,5-dicyano-4-piperidinopyridine | ethyl cyanoacetate | sodium 6-amino-α-ethoxycarbonyl-4-piperidino-α,3,5-tricyano-2-picolinide. |
| 6-amino-2-chloro-3,5-dicyano-4-phenylpyridine | ethyl nitroacetate | sodium 6-amino-3,5-dicyano-α-ethoxy-carbonyl-α-nitro-4-phenyl-2-picolinide. | sodium methoxide in methanol. To this methanol solution the indicated pyridine starting material (a 6-amino-3,5-dicyano-2-halogenopyridine) is added and the solution is stirred at room temperature for several hours. Part of the indicated sodium α,α-disubstituted 6-amino-3,5-dicyano-2-picolinide product separates as a precipitate and more separates when the mixture is drowned in ether. The sodium α,α-disubstituted 6-amino-3,5-dicyano-2-picolinide is separated by filtration, washed with ether and dried.

The barium salts of the α,α-disubstituted 6-amino-3,5-dicyano-2-picolines of this invention are particularly useful for preparing other salts by metathesis. The barium salts may be obtained by reaction of barium hydroxide with an aqueous solution of the free picoline. For example, an aqueous solution of 6-amino-α,α,3,4,5-pentacyano-2-picoline (Example II) is treated with an equivalent quantity of barium hydroxide to obtain an aqueous solution of barium 6-amino-α,α,3,4,5-pentacyano-2-picolinide. This solution is used to prepare other 6-amino-α,α,3,4,5-pentacyano-2-picolinide salts by reacting with aqueous solutions of the corresponding sulfate. Barium sulfate precipitates quantitatively as a by-product and is readily filtered off, leaving an aqueous solution of a 6-amino-α,α,3,4,5-pentacyano-2-picolinide salt of the cation which was introduced in the form of its sulfate. In this way, barium 6-amino-α,α,3,4,5-pentacyano-2-picolinide reacts with aqueous solutions of the sulfates of Al, Ce, Cs, Cr++, Cr+++, Co++, Co+++, Cu++, Fe++, Fe+++, Ga, In, Ni++, Li, K, Mn++, Rb, Sn++, Sn++++, Th, UO₂, VO, Zn, Zr, NH₄⁺, C₆H₅NH₃⁺, (C₂H₅)₂NH₂⁺, $$(CH_3)_3NH^+$$

and $(CH_3)_3S^+$ to yield the corresponding metal, amine or sulfonium salts of 6-amino-α,α,3,4,5-pentacyano-2-picoline. The corresponding salts of the other α,α-disubstituted 6-amino-3,5-dicyano-2-picolines are obtained from the barium derivatives in the same manner.

The 6-amino-2-halogeno-3,5-dicyanopyridines used in the process of this invention are prepared as follows:

*6-amino-2-chloro-3,4,5-tricyanopyridine*

Synthesis of this compound proceeds by the following steps:

(1) Tetracyanoethylene is prepared from malononitrile and sulfur monochloride. To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1–2 mm.).

(2) A solution of pyridinium pentacyanopropenide [(NC)₂C=C(CN)—C(CN)₂·C₅H₆N] is then prepared by adding a solution of 393 parts of pyridine in 600 parts of water to a solution of 640 parts of tetracyanoethylene in 1980 parts of acetone (cooled to −25° C.). The mixture is allowed to warm slowly to room temperature. It is not necessary to isolate the pyridinium pentacyanopropenide which is formed in this solution. The mixture is saturated with hydrogen chloride by passing in the anhydrous gas. The mixture is then cooled to 0° C., and 5000 parts of cold water is added. The light yellow precipitate which forms is collected on a filter, washed with water and dried. The product is recrystallized from a mixture of alcohol and water to yield 450 parts of 6-amino-2-chloro-3,4,5-tricyanopyridine in the form of pale yellow needles melting at 228–229° C.

In the final step of the above synthesis, if hydrogen bromide or hydrogen iodide is substituted for hydrogen chloride, the reaction product is 6-amino-2-bromo-3,4,5-tricyanopyridine or 6-amino-2-iodo-3,4,5-tricyanopyridine, respectively.

*6-amino-2-chloro-3,5-dicyanopyridine*

Ninety-one parts of the hydrated sodium salt of 1,1,3,3-tetracyanopropene (Na[(NC)₂C=CH—C(CN)₂]·H₂O, Y. Urushibara, Bull. Chem. Soc. Japan 2, 278 (1927)), is dissolved in 3960 parts of acetone. The solution is saturated with hydrogen chloride by passing in an excess of the gas during a period of 20 minutes. A precipitate of 29 parts of sodium chloride forms and is removed by filtration. The filtrate is allowed to stand at room temperature for two days, during which time 85 parts of 6-amino-2-chloro-3,5-dicyanopyridine slowly precipitates. It is separated by filtration. The white crystalline solid sublimes without melting at 200° C.

*6-amino-2-chloro-3,5-dicyano-4-methylpyridine*

When the sodium salt of 2-methyl-1,1,3,3-tetracyanopropene (Urushibara and Takebayashi, Bull. Chem. Soc. Japan, 11, 557–575), is substituted for the sodium salt of 1,1,3,3-tetracyanopropene in the above synthesis, 6-amino-2-chloro-3,5-dicyano-4-methylpyridine is obtained.

*6-amino-3,5-dicyano-2-fluoro-4-methylpyridine*

When 6-amino-2-chloro-3,5-dicyano-4-methylpyridine is treated with potassium fluoride or silver fluoride by the method shown by Wagner and Zook, "Synthetic Organic Chemistry," Wiley, 1953, page 94, 6-amino-3,5-dicyano-2-fluoro-4-methylpyridine is obtained.

*6-amino-2-chloro-3,5 - dicyano - 4-methylmercaptopyridine, etc.*

When dicyanoketene dimethyl thioacetal (C(CN)₂=C(SCH₃)₂, Edwards and Kendall, U.S. 2,533,233), reacts with a single molecular equivalent of sodiomalononitrile in ethonal solution at room temperature, there is obtained the sodium salt of 2-methylmercapto-1,1,3,3-tetracyanopropene (sodium salt of α,γ-dicyano-β-methylmercaptoglutaconodinitrile). This compound is treated with anhydrous hydrogen chloride, and there is obtained 6-amino-2-chloro-3,5-dicyano-4-methylmercaptopyridine. By careful oxidation of the sodium salt of 2-methylmercapto-1,1,3,3-tetracyanopropene with a single molecular equivalent of potassium permanganate or acidic hydrogen peroxide, there is obtained 2-methylsulfinyl-1,1,3,3-tetracyanopropene which when treated with anhydrous hydrogen chloride yields 6-amino-2-chloro-3,5-dicyano-4-methylsulfinylpyridine. Further oxidation of 2-methylsulfinyl-1,1,3,3 - tetracyanopropene with permanganate yields 2-methylsulfonyl-1,1,3,3-tetracyanopropene which on treatment with anhydrous hydrogen chloride yields 6-amino-2-chloro-3,5-dicyano-4-methylsulfonylpyridine.

*6- amino-2-chloro-3,5-dicyano - 4-dicyanomethylpyridine*

When dicyanoketene dimethyl thioacetal reacts with two molecular equivalents of sodiomalononitrile in ethanol solution at room temperature, there is obtained the disodium salt of 2-dicyanomethylene-1,1,3,3-tetracyanopropane (sodium 2-dicyanomethylene-1,1,3,3-tetracyanopropane-1,3-diide). An acetone solution of this salt is saturated with hydrogen chloride and there is obtained 6-amino-2-chloro-3,5-dicyano-4-dicyanomethylpyridine.

*6-amino-2-chloro-3,5-dicyano-4-hydroxypyridine*

When cyanoacetyl chloride condenses with malononitrile, there is obtained 1,1,3-tricyanoacetone which in its enolic form, 2-hydroxy-1,1,3-tricyano-1-propene, is reacted first with sodium methylate and then with cyanogen bromide to yield the sodium salt of α,γ-dicyano-β- hydroxyglutaconodinitrile (sodium 2-hydroxy-1,1,3,3-tetracyanopropenide).

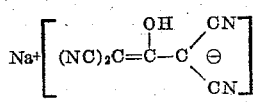

This compound is treated with anhydrous hydrogen chloride, and there is obtained 6-amino-2-chloro-3,5-dicyano-4-hydroxypyridine.

*6-amino-2-chloro-3,5-dicyano-4-phenoxypyridine*

The sodium salt of α,γ-dicyano-β-hydroxyglutaconodinitrile is carefully treated with small portions of phosphorus trichloride until a single equivalent of phosphorus trichloride has been added. There is obtained the sodium salt of β-chloro-α,γ-dicyanoglutaconodinitrile. This compound is treated with anhydrous hydrogen bromide to yield 6-amino-2-bromo-4-chloro-3,5-dicyanopyridine. Alternatively, by using phosphorus tribromide in place of phosphorus trichloride above, β-bromo-α,γ-dicyanoglutaconodinitrile is obtained. This compound is reacted with the sodium salt of phenol to yield the sodium salt of α,γ-dicyano-β-phenoxyglutaconodinitrile which, when treated with hydrogen chloride, yields 6-amino-2-chloro-3,5-dicyano-4-phenoxypyridine.

*6-amino-2-chloro-3,5-dicyano-4-phenylthiopyridine, etc.*

When the sodium salt of β-bromo-α,γ-dicyanoglutaconodinitrile is reacted with the sodium salt of thiophenol, the sodium salt of α,γ-dicyano-β-phenylthioglutaconodinitrile is obtained which, when treated with anhydrous hydrogen chloride, yields 6-amino-2-chloro-3,5-dicyano-4-phenylthiopyridine. By careful oxidation of the sodium salt of 2-phenylthio-1,1,3,3-tetracyanopropene (sodium salt of α,γ-dicyano-β-phenylthioglutaconodinitrile) with a single molecular equivalent of potassium permanganate or acidic hydrogen peroxide, there is obtained 2-phenylsulfinyl-1,1,3,3-tetracyanopropene, which when treated with anhydrous chloride yields 6-amino-2-chloro-3,5-dicyano-4-phenylsulfinylpyridine. Further oxidation of 2-phenylsulfinyl-1,1,3,3-tetracyanopropene with permanganate yields 2-phenylsulfonyl-1,1,3,3-tetracyanopropene, which when treated with anhydrous hydrogen chloride yields 6-amino-2-chloro-3,5-dicyano-4-phenylsulfonylpyridine.

*6-amino-2-chloro-3,5-dicyano-4-ethoxypyridine*

(1) The sodium salt of 2-ethoxy-1,1,3,3-tetracyanopropene is prepared as follows. Tetracyanoethylene is reacted with ethyl alcohol by dissolving 64 parts of tetracyanoethylene and 30 parts of urea (catalyst) in 395 parts of ethyl alcohol and heating the resulting solution at reflux until the initial deep purple color fades to a yellow. The solution is cooled and poured into 5000 parts of cold water. Dicyanoketene diethyl acetal (60 parts) separates as an oil which solidifies on standing. It is purified by recrystallization from a mixture of alcohol and water.

(2) Dicyanoketene diethylacetal (554 parts) is added to a solution of sodiomalononitrile prepared by dissolving 77 parts of sodium in 3946 parts of absolute ethyl alcohol and adding 220 parts of malononitrile. As the solid dissolves, the solution becomes warm. The white precipitate which forms upon cooling is collected on a filter, washed with ether, and recrystallized from alcohol. There is obtained 450 parts of the sodium salt of 2-ethoxy-1,1,3,3-tetracyanopropene in the form of white needles which melt above 300° C.

(3) A solution of 104 parts of the sodium salt of 2-ethoxy-1,1,3,3-tetracyanopropene in 2376 parts of acetone is saturated with dry hydrogen chloride by passing in an excess of the gas over a 20-minute period. Sodium chloride (29 parts) precipitates and is separated by filtration. The filtrate is allowed to stand overnight, and 85 parts of 6-amino-2-chloro-3,5-dicyano-4-ethoxypyridine crystallizes out. This white crystalline solid starts to sublime at 175° C. and melts at 264–265° C.

*2-chloro-4,6-diamino-3,5-dicyanopyridine*

The sodium salt of 2-ethoxy-1,1,3,3-tetracyanopropene is dissolved in concentrated aqueous ammonium hydroxide, and the mixture is boiled. There is obtained the sodium salt of 2-amino-1,1,3,3-tetracyanopropene which, when treated with hydrogen chloride in tetrahydrofuran solution, yields 2-chloro-4,6-diamino-3,5-dicyanopyridine.

*6-amino-2-chloro-3,5-dicyano-4-methylaminopyridine*

When methylamine is used in place of ammonia in the reaction with 2-ethoxy-1,1,3,3-tetracyanopropene, 2-methylamino-1,1,3,3-tetracyanopropene is obtained which on treatment with hydrogen chloride yields 6-amino-2-chloro-3,5-dicyano-4-methylaminopyridine.

*6-amino-2-chloro-3,5-dicyano-4-piperidinopyridine*

By similar steps starting with piperidine, 2-piperidino-1,1,3,3-tetracyanopropene yields 6-amino-2-chloro-3,5-dicyano-4-piperidinopyridine.

*6-amino-2-chloro-3,5-dicyano-4-phenylpyridine*

(1) Tricyanovinylbenzene is prepared by heating a solution of 14,900 parts of benzoyl cyanide, 500 parts of malononitrile, 66 parts of piperidine, and 236 parts of acetic acid in 4,400 parts of benzene at reflux temperature. The water formed is removed by azeotropic distillation through a continuous water separator. After 41 hours the solution is cooled, washed with water, and dried over anhydrous magnesium sulfate. Benzene is removed by distillation at atmospheric pressure, and excess benzoyl cyanide is removed by distillation at reduced pressure. The residue of 2,060 parts of tricyanovinylbenzene is recrystallized three times from cyclohexane to give yellow needles melting at 97–99.5° C.

(2) The sodium salt of 2-phenyl-1,1,3,3-tetracyanopropene is prepared by treating a suspension of sodiomalononitrile (prepared by adding 195 parts of malononitrile in 198 parts of ethanol to a solution of sodium ethoxide prepared from 68 parts of sodium and 946 parts of ethanol) with a solution containing 529 parts of tricyanovinylbenzene in 2370 parts of ethanol and 1500 parts of benzene. This addition is carried out at 0–5° C., and the mixture is stirred for one-half hour after addition is completed. Most of the solvent is removed at reduced pressure. Benzene is added to the remaining purple oil, and the solution is stored overnight at 5° C. The sodium salt of 2-phenyl-1,1,3,3-tetracyanopropene precipitates as a white crystalline solid which is separated by filtration, washed with benzene, and dried to yield 463 parts of product melting above 300° C.

(3) To a solution of 240 parts of the sodium salt of 2-phenyl-1,1,3,3-tetracyanopropene in 2000 parts of water is added a solution of 110 parts of tetramethylammonium chloride in 1000 parts of water. The resulting suspension is heated, and water is added until a clear solution is obtained. Upon cooling this solution, the tetramethylammonium salt of 2-phenyl-1,1,3,3-tetracyanopropene is precipitated as colorless needles which are recrystallized from water and dried exhaustively at 125–130° C. under reduced pressure to yield the anhydrous salt in the form of colorless needles melting at 141–142.5° C.

(4) A solution of 261 parts of the tetramethylammonium salt of 2-phenyl-1,1,3,3-tetracyanopropene in 2070 parts of dioxane is heated to boiling and stirred. Hydrogen chloride gas is bubbled into the solution, and an exothermic reaction occurs. The external heat source is removed, and hydrogen chloride is passed through the solution to keep it saturated with hydrogen chloride for an additional 4½ hours. This solution is diluted with 714 parts of ether, cooled, and the white precipitate is filtered and washed, first with cold ether, then with water and dried to yield 201 parts (87.6%) of 6-amino-2-chloro-3,5-dicyano-4-phenylpyridine, melting at 300–309° C. (with previous softening). Recrystallization from chloroform gives purified product in the form of a white crystalline solid melting at 303–308° C. with previous sublimation.

*6-amino-2-chloro-3,5-dicyano-4-(p-dimethylaminophenyl) pyridine*

(1) N,N-dimethyl-p-tricyanovinylaniline is prepared by heating a solution of 10 parts of tetracyanoethylene and 19.3 parts of N,N-dimethylaniline in 178 parts of tetrahydrofuran at reflux temperature for 5–10 minutes. Tetrahydrofuran is evaporated from the resulting deep blue solution, leaving 16 parts of N,N-dimethyl-p-tricyanovinylaniline in the form of a bright blue crystalline solid. It is purified by washing with ether and is recrystallized from ethyl alcohol.

(2) A suspension of sodiomalononitrile in ethyl alcohol is prepared in an atmosphere of nitrogen by adding 232 parts of malononitrile in 237 parts of ethanol to a solution of sodium ethoxide, prepared from 81 parts of sodium and 1580 parts of ethanol. An additional 395 parts of ethanol is added, and the suspension is cooled to 2° C. A solution of 782 parts of N,N-dimethyl-p-tricyanovinylaniline in 9770 parts of tetrahydrofuran is added slowly over a period of 25 minutes. The solution is stirred for an additional hour at 5° C. and then for two hours at room temperature. The solvent is removed by distillation at reduced pressure yielding 1159 parts of the sodium salt of 2-(p-dimethylaminophenyl)-1,1,3,3-tetracyanopropene in the form of brown solid melting above 300° C.

(3) A filtered solution of 283 parts of the sodium salt of 2-(p-dimethylaminophenyl)-1,1,3,3-tetracyanopropene in 5000 parts of water is stirred with a solution of 111 parts of tetramethylammonium chloride in 500 parts of water. The resulting solution is cooled, and the violet-colored precipitate which forms is separated by filtration, washed with cold water and dried to yield 193 parts (57.8%) of the crude tetramethylammonium salt of 2-(p-dimethylaminophenyl) - 1,1,3,3 - tetracyanopropene. After recrystallization from ethanol, this product is obtained in the form of violet-colored plates melting at 233–238° C. with decomposition.

(4) A suspension of 98 parts of the tetramethylammonium salt of 2-(p-dimethylaminophenyl)-1,1,3,3-tetracyanopropene in 5177 parts of dioxane is heated under reflux with stirring, while a stream of hydrogen chloride gas is bubbled through the solution. In a short time all of the starting material has dissolved, and a precipitate starts to form. After 2 hours the solution is cooled and diluted with 1070 parts of ether. The solid which precipitates is collected by filtration, washed with a cold 1:1 mixture of dioxane and ether, then washed with water and dried to give 75 parts (86%) of 6-amino-2-chloro-3,5-dicyano - 4 - (p-dimethylaminophenyl)pyridine. Recrystallization of this material from dimethylformamide gives a bright yellow solid melting above 320° C.

The α,α-disubstituted 6-amino-3,5-dicyano-2-picolines are all colored compounds which are substantive as dyes, particularly for wool. To observe this property it suffices to boil a wool fabric or yarn in an aqueous solution or suspension of the α,α-disubstituted 6-amino-3,5-dicyano-2-picoline. More elaborate dyeing procedures may also be used, particularly those employing in addition mild acids, such as acetic acid, and dispersing agents.

The compounds of the present invention become luminescent under ultraviolet light. This effect may be observed by visual examination of the appearance of a powdered sample of the compound under ultraviolet light (U.V.) of various wave lengths. Observations of this sort are shown in the following table:

TABLE II

| Compound | Luminescence | |
|---|---|---|
| | U.V. (2537 Å.) | U.V. (3650 Å.) |
| 6-Amino-α,α,3,4,5-pentacyano-2-picoline | | red. |
| Tetramethylammonium 6-amino-α,α,3,4,5-pentacyano-2-picolinide. | orange | orange. |
| Tetraethylammonium 6-amino-α,α,3,4,5-pentacyano-2-picolinide. | do | |

The luminescence of the α,α-disubstituted 6-amino-3,5-dicyano-2-picolines, including their salts, under ultraviolet light makes these compounds useful as fluorescent pigments in fluorescent glow sheets, for illuminated dials, charts and the like. To use these compounds as fluorescent pigments, they may be embedded in powder form in a transparent thermoplastic sheet, portions of which are cut and in turn embedded in the face of a supporting thermoplastic base to produce a pattern which is sharply visible when the surface of the composite is illuminated with ultraviolet light. Preparation of composite glow sheets of this type is shown in U.S. Patent 2,340,227, issued January 25, 1944, to A. R. Russell.

Since many different embodiments of the invention may be made without departing from the spirit and scope thereof, it is to be understood that the invention is not limited by the specific illustrations except to the extent defined in the following claims.

What is claimed is:

1. 6-amino-α,α-3,4,5-pentacyano-2-picolinide salt of a metal.

2. The process which comprises mixing a 6-amino-3,5-dicyano-2-halogenopyridine in anhydrous alcohol with an alkali metal derivative of a methylene compound having two substituents on the methylenic carbon selected from the group consisting of cyano, acetyl, benzoyl, carbamoyl, ethoxycarbonyl, ethoxysulfonyl, methylsulfonyl, phenylsulfonyl, 1-amino-2,2-dicyanovinyl, nitro and N-pyrindinium substituents in the presence of sufficient alkali metal base to form an alkali metal salt of an α,α-disubstituted 6-amino-3,5-dicyano-2-picoline as a precipitate, and separating this product from the reaction mixture.

3. The process for preparing a 6-amino-α,α,3,5-tetracyano-2-picoline which comprises reacting a 6-amino-3,5-dicyano-2-halogenopyridine with an alkali metal malononitrile in the absence of water.

4. The process for preparing a 6-amino-α,α-3,4,5-pentacyano-2-picoline which comprises reacting a 6-amino-3,4,5-tricyano-2-halogenopyridine with an alkali metal malononitrile in the absence of water.

5. Substituted 6-amino-3,5-dicyano-2-picolines of the general formula

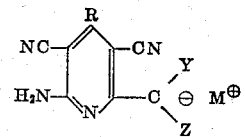

wherein R is a member selected from the class consisting of hydrogen, cyano, dicyanomethyl, amino, hydroxyl, lower alkyl, phenyl, lower alkoxy, phenoxy, lower alkylthio, phenylthio, lower alkylsulfinyl, phenylsulfinyl, lower alkylsulfonyl and phenylsulfonyl, Y and Z are selected from the class consisting of cyano, acetyl, benzoyl, carbamoyl, ethoxycarbonyl, ethoxysulfonyl, methylsulfonyl, phenylsulfonyl, 1-amino-2,2-dicyanovinyl, nitro and N-pyrindinium substituents and M is a cation selected from the class consisting of hydrogen, metal, amine and sulfonium ions.

6. Process which comprises reacting in the absence of water a 6-amino-3,5-dicyano-2-halogenopyridine of the formula

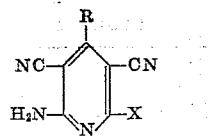

wherein R is a member selected from the class consisting of hydrogen, cyano, dicyanomethyl, amino, hydroxyl, lower alkyl, phenyl, lower alkoxy, phenoxy, lower alkylthio, phenylthio, lower alkylsulfinyl, phenylsulfinyl, lower alkylsulfonyl and phenylsulfonyl, and X represents halogen, with a compound of the formula

wherein Y and Z are selected from the class consisting of cyano, acetyl, benzoyl, carbamoyl, ethoxycarbonyl, ethoxysulfonyl, methylsulfonyl, phenylsulfonyl, 1-amino-2,2-dicyanovinyl, nitro and N-pyridinium substituents, and M is a cation selected from the class consisting of hydrogen, metal, amine and sulfonium ions.

7. A process as defined in claim 6 wherein the reaction is conducted in an inert liquid medium.

8. A process as defined in claim 6 wherein the reactants are brought together in solution in an inert liquid medium.

9. A process as defined in claim 6 wherein the reaction is carried out at room temperature.

10. A process as defined in claim 6 wherein approximately equal molecular equivalents of the reactants are reacted in the presence of sufficient alkali metal base to form an alkali metal salt of the $\alpha,\alpha$-disubstituted 6-amino-3,5-dicyano-2-picoline.

11. 6-amino-$\alpha,\alpha$,3,4,5-pentacyano-2-picolinide sulfonium salt.

12. 6-amino-$\alpha,\alpha$,3,4,5-pentacyano-2-picolinide salt of an amine.

13. 6-amino - 4 - (p-dimethylaminophenyl) - $\alpha,\alpha$,3,5-tetracyano-2-picoline salt of a metal.

References Cited in the file of this patent

Grummitt et al.: Chem. Abst., vol. 40, col. 1156[4] (1946).